Dec. 16, 1969   J. CSAKI   3,484,860
ELECTROMOTOR WITH DETACHABLE STATOR
Filed Nov. 21, 1967

Inventor:
Joachim Csaki
by Michael S. Striker,
Attorney

United States Patent Office 3,484,860
Patented Dec. 16, 1969

3,484,860
ELECTROMOTOR WITH DETACHABLE STATOR
Joachim Csaki, Stuttgart-Feuerbach, Germany, assignor to Ackermann U. Schmitt K.G., Stuttgart, Germany
Filed Nov. 21, 1967, Ser. No. 684,858
Claims priority, application Germany, Nov. 26, 1966, A 54,190
Int. Cl. H02k 3/04
U.S. Cl. 310—42
10 Claims

ABSTRACT OF THE DISCLOSURE

An electromotor has a stator with axially projecting plugs connected with a field winding on the stator and fitting into corresponding sockets fixed to the casing and connected with the terminals of the electromotor so that the necessary connections are made when the stator is inserted into the casing.

BACKGROUND OF THE INVENTION

Known electromotors have the disadvantage of a difficult assembly since the end portions of the flexible wires of the field windings have to be connected with the brushes and terminals on the casing of the motor. It is particularly difficult to assemble small electromotors, and the connection of the wires and the threading of the same through bores requires great manual dexterity and skilled workers. Nevertheless, the assembly operations are time-consuming.

SUMMARY OF THE INVENTION

It is one object of the invention to overcome this disadvantage of known electromotors, particularly small electromotors, and to provide an electromotor in which all necessary electric connections are obtained by inserting the stator in to the casing.

Another object of the invention is to provide an electromotor which can be assembled in a very short time, and which requires no screws or soldering for obtaining the electric connections between the stator winding and the other elements of the motor.

Another object of the invention is to provide an electromotor in which all electric connections are obtained by plug-and-socket connecting means which engage each other during insertion of the stator into the casing in axial direction of the same.

With these objects in view, the present invention is concerned with electromotors having detachable stators. One embodiment of the invention comprises a stator having a winding and being located in an operative position in a casing, first connector means, preferably plugs, secured to the stator and connected with the winding, and second connector means, preferably sockets, secured to the casing.

The second connector means are located in the casing in such a position that the first and second connector means form an electric connection when the stator is in its operative position.

In accordance with the invention, the first and second connector means have first and second surface means extending in one direction and fitting on each other for sliding movement in this direction. For example, axially projecting plugs on the stator fit into axially extending sockets on the casing. Consequently, the stator can be moved out of the casing in axial direction, and can be inserted in a position in which the first and second contact surface means register with each other in axial direction so that the first and second contact surface means slidingly engage each other during insertion, and form electric connections when the stator is in its operative position in the casing.

In a preferred embodiment of the invention, two pairs of plugs and sockets are provided for connecting the field winding of the stator on one hand with the brush holders and on the other hand with the terminals of the motor. It is advantageous to provide a carrying body consisting of cast resin secured to the field winding of the stator, and to embed the plugs into the cast resin body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
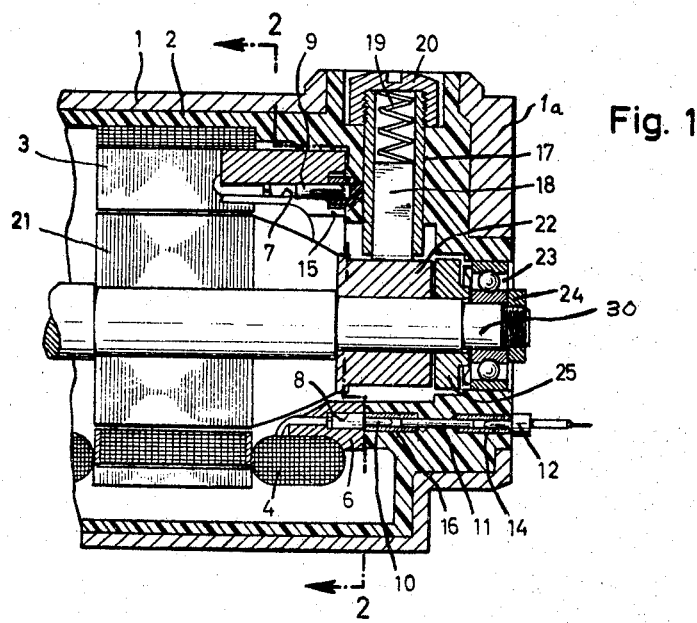
FIG. 1 is an axial sectional view taken on line 1—1 in FIG. 2 and illustrating an electromotor in accordance with one embodiment of the invention.

An outer casing 1 is closed at the ends thereof by covers 1a, of which only one is shown in FIG. 1 and lined by a layer of synthetic plastic material 2. Bearings 23 pressed into the plastic lining 2 support the rotor 21 including a shaft 30 for rotation about a central axis. An axial displacement of ball bearing 23 is prevented by a nut 24 and a spacing member 25 which abuts a commutator or collector secured to the shaft 30. A pair of tubular metallic holders 17 hold and guide brushes 18 for axial movement towards member 22 under the action of springs 19. Only one brush holder is shown in FIG. 1. A thrust bearing, not shown, holds rotor 21 and shaft 30 against axial movement.

Figure 2:
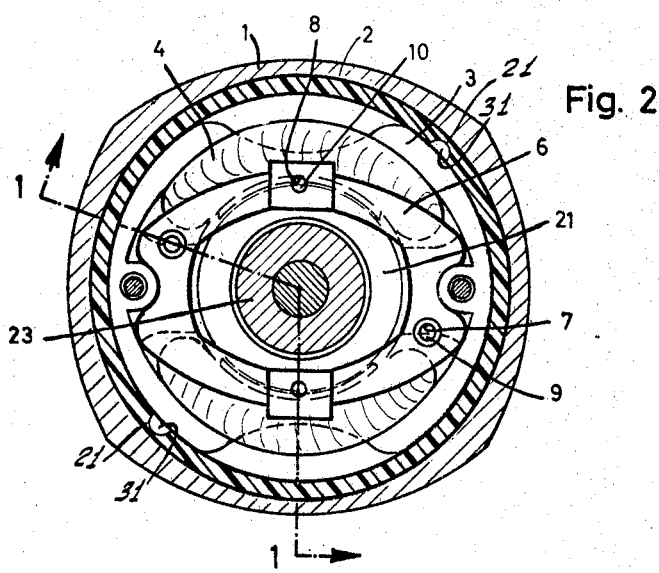
FIG. 2 is a cross-sectional view taken no line 2—2 in FIG. 1.

FIGS. 1 and 2 show a stator 3 in an operative position inserted into casing 1 from the left as viewed in FIG. 1. Stator 3 has an annular core and a field winding 4. An annular body 6 consisting of a cast resin is permanently connected with field winding 4 and surrounds shaft 30. Resin body 6 has two pairs of axially extending bores 7 and 8 into which two pairs of connector plugs 9 and 10 are partly inserted. Connector plugs 10 and 9 are embedded in the cast resin and extend in one direction parallel to the axis of shaft 30. The free projecting portions of plugs 9 and 10 are provided with a slot so that the outer contact surfaces of plugs 9 and 10 resiliently engage the inner contact surfaces of two pairs of connector sockets 15 and 16.

Connector sockets 15 are electrically connected with the holding and guide means 17 of the two brushes 18. Connector sockets 16 are connected by short connectors 11 with the terminal sockets 14 of the motor to which switches may be connected by plugs 12.

As best seen in FIG. 2, the two plugs 9 are diametrically arranged in a radial plane passing through the axis of shaft 30 and of casing 1. Connector plugs 10 are diametrically arranged in another radial plane.

During the assembly of the motor, stator 3 with winding 4, resin body 6 and the two pairs of plugs 10 and 9 is inserted into casing 1, 2 in an angular position in which plugs 10 register with sockets 16, and plugs 9 register with sockets 15. Due to the diametrical arrangement of connector means 10, 16 and 9, 15, it is possible to insert the stator in two angular positions spaced 180°

When stator 3 is inserted into casing 1, 2 in a direction parallel to the axis, the plugs move into the corresponding sockets and all necessary electric connections are established when the stator is in its operative position shown in FIG. 1 in which an annular end face of the resin body 6 abuts an annular end face of the plastic lining 2 of casing 1, 2. Since the annular core of stator 3 has an annular circumferential surface fitting into the lining 2, stator 3 is accurately positioned in its operative position for cooperation with rotor 21.

Lining 2 and the outer surface of stator 3 advantageously have cooperating axial guide means, such as a ridge 31 on stator 3 and an axially extending notch 21 in lining 2 so that stator 3 must be placed during insertion in an angular position in which conductor means 9, 15 and 10, 16, respectively register so that the plugs 10 and 9 directly slide into the corresponding sockets.

When repair or servicing of the motor is required, stator 3 is simply pulled out of the casing, in an axial direction toward the left as viewed in FIG. 1, and then again reinserted with plugs 10 and 9 sliding into connectors 16 and 15, establishing the necessary electric connections with brush holders 17 and terminals 14 without requiring soldering or clamping of wires.

Instead of a plug and socket connection, other connector means having contact surfaces fitting on each other for sliding movement in the direction of insertion of the stator may be used. For example, the plugs 9 may be replaced by fork-shaped connectors having resilient prongs slidingly engaging and embracing brush holders 17 to directly form the electric connections.

It will be understood that each of the elements described above, or two or more together, may also find a useful application in other types of electromotors with detachable stators differing from the types described above.

While the invention has been illustrated and described as embodied in an electromotor having a field winding connected with the brushes and terminals of the motor by plug-and-socket connections, it is not intended to be limited to the details shown, since various modifications and structural changes may be made without departing in any way from the spirit of the present invention.

What is claimed as new desired to be protected by Letters Patent is set forth in the appended claims.

What is claimed is:

1. Electromotor with detachable stator, comprising, in combination, casing means: a stator having a winding and being located in an operative position in said casing means; first connector means secured to said stator and connected with said winding; and second connector means secured to said casing means and located in said casing means in such a position that said first and second connector means form an electric connection when said stator is in said operative position, said first and second connector means having first and second contact surface means, respectively, extending in one direction, and fitting on each other for sliding movement in said one direction so that said stator can be moved out of said casing means in said one direction, and can be inserted in a position in which said first and second contact surface means register with each other in said one direction so that said first and second contact surface means slidingly engage each other during insertion, and form said electric connection when said stator is in said operative position.

2. Electromotor as claimed in claim 1 wherein said casing means and said stator have a common axis extending in said one direction so that said first and second connector means register with each other in at least one angular position of said stator in relation to said axis; said stator and said casing means, respectively, having cooperating axially extending guide means engaging each other in said angular position.

3. Electromotor as claimed in claim 1 wherein said first and second connector means are at least partly resilient so that said first and second contact surfaces resiliently abut each other during insertion and in said operative position of said stator.

4. Electromotor as claimed in claim 1 wherein said first and second connector means include a plurality of pairs of first and second connectors, each pair having cooperating first and second contact means.

5. Electromotor as claimed in claim 4 wherein said stator and casing means have a common axis extending in said one direction, said first and second connector means being uniformly spaced about said axis so as to register in a plurality of angular positions of said stator in relation to said axis.

6. Electromotor as claimed in claim 4 wherein one connector of each pair of first and second connectors is a plug, and the other connector of each pair is a socket, and wherein said first and second contact surface means are substantially cylindrical.

7. Electromotor as claimed in claim 6 wherein said plugs are mounted on said stator connected with said winding and said sockets are mounted on said casing means.

8. Electromotor as claimed in claim 7 wherein two pairs of plugs are mounted on said stator connected with said winding; wherein two pairs of said sockets are mounted on said casing means; and comprising a pair of brush connectors connected with one pair of sockets, and a pair of outer sockets mounted on the outer surface of said casing means and connected with the other pair of sockets.

9. Electromotor as claimed in claim 7 wherein said stator includes an insulating body carrying said winding and supporting said plugs and wherein said sockets are fixed to said casing means.

10. Electromotor as claimed in claim 9 wherein said insulating body consists of a casting of resin in which portions of said plugs are embedded.

References Cited

UNITED STATES PATENTS

| | | | |
|---|---|---|---|
| 2,881,406 | 4/1959 | Arson | 339—59 |
| 2,944,297 | 7/1960 | Maynard | 310—43 X |
| 2,994,004 | 7/1961 | Macha et al. | 310—42 |
| 3,256,590 | 6/1966 | Myers | 310—42 X |

WARREN E. RAY, Primary Examiner

U.S. Cl. X.R.

310—43, 71, 259, 260